(12) United States Patent
Narita

(10) Patent No.: US 9,846,852 B2
(45) Date of Patent: Dec. 19, 2017

(54) PRODUCT DELIVERY INSPECTION SYSTEM, ORDER-RECEIVING-SIDE HANDY TERMINAL, ORDERING-SIDE HANDY TERMINAL, AND CONTAINER

(71) Applicant: Satoru Narita, Kanagawa (JP)

(72) Inventor: Satoru Narita, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 30 days.

(21) Appl. No.: 14/383,026

(22) PCT Filed: Mar. 25, 2013

(86) PCT No.: PCT/JP2013/058505
§ 371 (c)(1),
(2) Date: Sep. 4, 2014

(87) PCT Pub. No.: WO2013/146641
PCT Pub. Date: Oct. 3, 2013

(65) Prior Publication Data
US 2015/0081480 A1 Mar. 19, 2015

(30) Foreign Application Priority Data

Mar. 26, 2012 (JP) ................................. 2012-068906

(51) Int. Cl.
*G06Q 10/00* (2012.01)
*G06K 7/10* (2006.01)
(Continued)

(52) U.S. Cl.
CPC ......... *G06Q 10/083* (2013.01); *G06Q 10/087* (2013.01); *G06Q 30/06* (2013.01)

(58) Field of Classification Search
None
See application file for complete search history.

(56) References Cited

U.S. PATENT DOCUMENTS 8,599,023 B2 * 12/2013 Leggett, Jr. ............. G06F 3/147
235/375
2002/0130065 A1 * 9/2002 Bloom ......................... 209/630
(Continued)

FOREIGN PATENT DOCUMENTS

CN   1702672 A    11/2005
CN   102147888 A   8/2011
(Continued)

OTHER PUBLICATIONS

International Search Report of PCT/JP2013/058505 dated Apr. 23, 2013 [PCT/ISA/210].
(Continued)

*Primary Examiner* — Ariel J Yu
(74) *Attorney, Agent, or Firm* — Sughrue Mion, PLLC

(57) ABSTRACT

A product delivery inspection system includes an ordering-side terminal, an order-receiving-side terminal, an order-receiving-side handy terminal, a container, and an ordering-side handy terminal. The order-receiving-side handy terminal has an order-receiving-side reception means, a barcode reading means, a tag writing means, an order-receiving-side comparison means, and an order-receiving-side display instruction means that transmits to a display unit an instruction to display a message or a symbol indicative of the completion of an order-receiving-side product inspection. The ordering-side handy terminal has an ordering-side reception means, a tag reading means, an ordering-side comparison means, and an ordering-side display instruction means that transmits to the display unit an instruction to display a message or a symbol indicative of the completion of an ordering-side product inspection.

12 Claims, 12 Drawing Sheets

(51) Int. Cl.
  *G06K 15/00*  (2006.01)
  *G06Q 10/08*  (2012.01)
  *G06Q 30/06*  (2012.01)

(56) References Cited

U.S. PATENT DOCUMENTS

2005/0222707 A1    10/2005   Sano et al.
2007/0268319 A1*   11/2007   Tatewaki et al. .................. 347/1
2009/0230189 A1*    9/2009   Louie et al. .................. 235/385
2010/0072280 A1*    3/2010   McGill ............ G06K 19/06206
                                                              235/462.13

FOREIGN PATENT DOCUMENTS

| JP | 08-016672 A   | 1/1996  |
| JP | 10-187843 A   | 7/1998  |
| JP | 2005-132515 A | 5/2005  |
| JP | 2006-282347 A | 10/2006 |
| JP | 2008-037560 A | 2/2008  |
| JP | 2009-184806 A | 8/2009  |
| JP | 2011-081525 A | 4/2011  |

OTHER PUBLICATIONS

Communication dated Aug. 12, 2016, from the State Intellectual Property Office of People's Republic of China in counterpart Application No. 201380016750.1.

Xu Yan-ping et al., "Research and design of drug acceptance with two-dimension barcode in drug supply logistics guarantee system in our hospital", Chinese Journal of Drug Application and Monitoring, Jun. 2011, vol. 8, No. 3, three pages total.

* cited by examiner

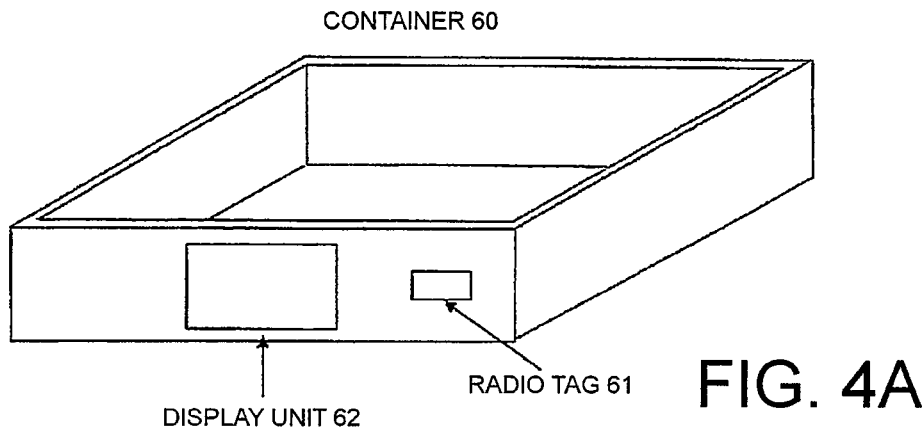
FIG. 4A
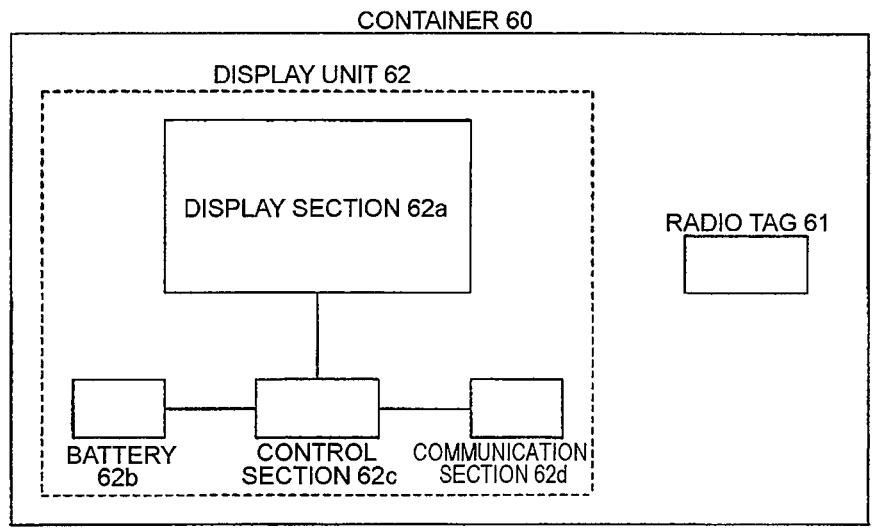
FIG. 4B
| CONTAINER NUMBER | C0001 |
|---|---|
| RADIO TAG ID CODE | C0001 T |
| DISPLAY UNIT ID CODE | C0001 D |
FIG. 4C

ORDERING DATA

| ORDERING NUMBER | S0001 2012030601 | |
|---|---|---|
| SHOP NAME | OX Store AB | |
| SHOP CODE | S0001 | |
| ORDERING DATE | 2012.03.06 | |
| DELIVERY DATE | 2012.03.07 | |
| PRODUCT NAME | PRODUCT CODE | QUAN-TITY |
| AAA | 10001 | 5 |
| BBB | 10002 | 20 |
| CCC | 10003 | 10 |
| ⋮ | | |
| ZZZ | 11001 | 8 |

FIG. 7

ORDER RECEPTION DATA

| | |
|---|---|
| ORDER RECEPTION NUMBER | D0001 201 2030605 |
| ORDER RECEPTION DATE | 2012.03.06 |
| CUSTOMER'S ORDERING NUMBER | S0001 201 2030601 |
| SHOP NAME | OX Store AB |
| SHOP CODE | S0001 |
| ORDERING DATE | 2012.03.06 |
| DELIVERY DATE | 2012.03.07 |

| PRODUCT NAME | PRODUCT CODE | QUAN-TITY |
|---|---|---|
| AAA | 10001 | 5 |
| BBB | 10002 | 20 |
| CCC | 10003 | 10 |
| ⋮ | | |
| ZZZ | 11001 | 8 |

FIG. 8

| | |
|---|---|
| DELIVERY NUMBER | D2012030701-01 |
| CONTAINER NUMBER | C0001 |
| RADIO TAG ID CODE | C0001T |
| DISPLAY UNIT ID CODE | C0001D |
| CUSTOMER'S ORDERING NUMBER | S00012012030601 |
| SHOP NAME | OX Store AB |
| DELIVERY DATE | 2012.03.07 |

| PRODUCT NAME | PRODUCT CODE | QUAN-TITY |
|---|---|---|
| AAA | 10001 | 5 |
| BBB | 10002 | 20 |
| CCC | 10003 | 10 |
| ⋮ | | |

FIG. 9A

| | |
|---|---|
| DELIVERY NUMBER | D2012030701-02 |
| CONTAINER NUMBER | C0002 |
| RADIO TAG ID CODE | C0002T |
| DISPLAY UNIT ID CODE | C0002D |
| CUSTOMER'S ORDERING NUMBER | S00012012030601 |
| SHOP NAME | OX Store AB |
| DELIVERY DATE | 2012.03.07 |

| PRODUCT NAME | PRODUCT CODE | QUAN-TITY |
|---|---|---|
| HHH | 10008 | 6 |
| III | 10009 | 18 |
| JJJ | 10010 | 7 |
| ⋮ | | |

FIG. 9B

| | | |
|---|---|---|
| DELIVERY NUMBER | D2012030701-03 | |
| CONTAINER NUMBER | C0003 | |
| RADIO TAG ID CODE | C0003T | |
| DISPLAY UNIT ID CODE | C0003D | |
| CUSTOMER'S ORDERING NUMBER | S0001 2012030601 | |
| SHOP NAME | OX Store AB | |
| DELIVERY DATE | 2012.03.07 | |
| PRODUCT NAME | PRODUCT CODE | QUAN-TITY |
| OOO | 10020 | 4 |
| PPP | 10021 | 12 |
| QQQ | 10022 | 8 |
| ⋮ | | |

|  |  |
|---|---|
| DELIVERY NUMBER |  |
| CUSTOMER'S ORDERING NUMBER |  |
| SHOP NAME |  |
| DELIVERY DATE |  |

FIG. 10B

| Checked. Deliver to shop. ||
|---|---|
| DELIVERY NUMBER | D2012030701-01 |
| CUSTOMER'S ORDERING NUMBER | S00012012030601 |
| SHOP NAME | OX Store AB |
| DELIVERY DATE | 2012.03.07 |

FIG. 10C

| Inspected. Exhibit or store the products. ||
|---|---|
| DELIVERY NUMBER | D2012030701-01 |
| CUSTOMER'S ORDERING NUMBER | S00012012030601 |
| SHOP NAME | OX Store AB |
| DELIVERY DATE | 2012.03.07 |

FIG. 10D

| Product BBB is in shortage by 1. Suspend exhibition/storage of the products. ||
|---|---|
| DELIVERY NUMBER | D2012030701-01 |
| CUSTOMER'S ORDERING NUMBER | S00012012030601 |
| SHOP NAME | OX Store AB |
| DELIVERY DATE | 2012.03.07 |

US 9,846,852 B2

PRODUCT DELIVERY INSPECTION SYSTEM, ORDER-RECEIVING-SIDE HANDY TERMINAL, ORDERING-SIDE HANDY TERMINAL, AND CONTAINER

CROSS REFERENCE TO RELATED APPLICATIONS

This is a National Stage of International Application No. PCT/JP2013/058505 filed Mar. 25, 2013, claiming priority based on Japanese Patent Application No. 2012-068906 filed Mar. 26, 2012, the contents of all of which are incorporated herein by reference in their entirety.

TECHNICAL FIELD

This invention relates to a product delivery inspection system, an order-receiving-side handy terminal, an ordering-side handy terminal, and a container.

BACKGROUND ART

Conventionally, as a product delivery inspection system that facilitates product inspection operations, there is known a product delivery inspection system comprising an ordering-side device that is provided in a shop and outputs product ordering information in the shop, and an order-receiving-side device that is provided in a department that prepares ordered products based on the product ordering information from the shop, puts them in a product container, and ships it (see, e.g. Patent Document 1).

The order-receiving-side device has a two-dimensional data code printing means for printing a label sheet including information about product codes of the products and a quantity per product, while, the ordering-side device has a two-dimensional data code reading means for reading product delivery information from the label sheet attached to the product container and an ordering-side product inspection judging means for comparison between the product ordering information stored in the ordering-side device and the product delivery information.

PRIOR ART DOCUMENT

Patent Document

Patent Document 1: JP-A-H10-187843

SUMMARY OF THE INVENTION

Problem to be Solved by the Invention

However, with the product delivery inspection system of Patent Document 1, it is not possible to judge at a glance whether or not an order-receiving-side product inspection before delivery of the products on the order receiving side or an ordering-side product inspection after delivery of the products on the ordering side has been completed for the product container. Therefore, there has been a problem that erroneous shipping of products occurs on the order receiving side or that, on the ordering side, omission of product inspection occurs due to misunderstanding that the product inspection operation has been completed or the product inspection operation is carried out twice due to misunderstanding that the product inspection has not been completed.

Therefore, this invention aims to solve the conventional problem, that is, it is an object of this invention to provide a product delivery inspection system, an order-receiving-side handy terminal, an ordering-side handy terminal, and a container, that can make it possible to avoid erroneous shipping of products on the order receiving side and to avoid omission of product inspection or duplicate product inspection operations on the ordering side.

Means for Solving the Problem

According to this invention, there is provided a product delivery inspection system comprising an ordering-side terminal that transmits ordering data, an order-receiving-side terminal that receives the ordering data and stores the ordering data as order reception data, an order-receiving-side handy terminal for use in an order-receiving-side product inspection of a product before delivery thereof, a container for use in the delivery of the product, and an ordering-side handy terminal for use in an ordering-side product inspection of the product after the delivery thereof, wherein the container comprises a radio tag and a display unit, wherein the order-receiving-side handy terminal comprises an order-receiving-side reception means that receives the order reception data from the order-receiving-side terminal, a barcode reading means that reads a product code from a barcode attached to the product, a tag writing means that writes, into the radio tag, data including the product code read by the barcode reading means and a product quantity, an order-receiving-side comparison means that compares the product code read by the barcode reading means and the product quantity with a product code and a product quantity included in the order reception data, an order-receiving-side display instruction means that transmits to the display unit a display instruction to display a message or a symbol indicative of the completion of the order-receiving-side product inspection when it is judged by the order-receiving-side comparison means that the product codes and the product quantities are in agreement, a display means for displaying a name and a quantity of a surplus or shortage product when it is judged by the order-receiving-side comparison means that the product codes and the product quantities are not in agreement and a product surplus or shortage occurs, and a correcting means for correcting the data when the product surplus or shortage in the container is corrected, wherein the tag writing means writes corrected data into the radio tag, and wherein the ordering-side handy terminal comprises an ordering-side reception means that receives the ordering data from the ordering-side terminal, a tag reading means that reads, from the radio tag, the product code and the product quantity written by the tag writing means, an ordering-side comparison means that compares the product code and the product quantity read by the tag reading means with a product code and a product quantity included in the ordering data, and an ordering-side display instruction means that transmits to the display unit a display instruction to display a message or a symbol indicative of the completion of the ordering-side product inspection when it is judged by the ordering-side comparison means that the product codes and the product quantities are in agreement or to display a name and a quantity of a surplus or shortage product when it is judged by the ordering-side comparison means that the product codes and the product quantities are not in agreement and a product surplus or shortage occurs. With this structure, the above-mentioned problem is solved.

According to this invention, there is provided an order-receiving-side handy terminal for use in an order-receiving-side product inspection of a product before delivery thereof, comprising a barcode reading means that reads a product code from a barcode attached to the product, a tag writing means that writes, into a radio tag of a container, data including the product code read by the barcode reading means and a product quantity, an order-receiving-side comparison means that compares the product code read by the barcode reading means and the product quantity with a product code and a product quantity included in order reception data, an order-receiving-side display instruction means that transmits to a display unit of the container a display instruction to display a message or a symbol indicative of the completion of the order-receiving-side product inspection when it is judged by the order-receiving-side comparison means that the product codes and the product quantities are in agreement, a display means for displaying a name and a quantity of a surplus or shortage product when it is judged by the order-receiving-side comparison means that the product codes and the product quantities are not in agreement and a product surplus or shortage occurs, and a correcting means for correcting the data when the product surplus or shortage in the container is corrected, the tag writing means writing corrected data into the radio tag. With this structure, the above-mentioned problem is solved.

According to this invention, there is provided an ordering-side handy terminal for use in an ordering-side product inspection of a product after delivery thereof, comprising a tag reading means that reads a product code and a product quantity from a radio tag of a container, an ordering-side comparison means that compares the product code and the product quantity read by the tag reading means with a product code and a product quantity included in ordering data, and an ordering-side display instruction means that transmits to a display unit of the container a display instruction to display a message or a symbol indicative of the completion of the ordering-side product inspection when it is judged by the ordering-side comparison means that the product codes and the product quantities are in agreement or to display a name and a quantity of a surplus or shortage product when it is judged by the ordering-side comparison means that the product codes and the product quantities are not in agreement and a product surplus or shortage occurs. With this structure, the above-mentioned problem is solved.

According to this invention, there is provided a container for use in delivery of a product, comprising a radio tag that stores at least a product code and a product quantity in a readable and writable manner, and a display unit that receives a display instruction based on a product inspection result from a handy terminal for use in a product inspection, the display unit displaying a message or a symbol indicative of the completion of product inspection when the display instruction is based on the product inspection result that the handy terminal judges that the product codes and the product quantities are in agreement, the display unit displaying a name and a quantity of a surplus or shortage product when the display instruction is based on the product inspection result that the handy terminal judges that the product codes and the product quantities are not in agreement and a product surplus or shortage occurs. With this structure, the above-mentioned problem is solved.

Effect of the Invention

According to this invention, it is possible to judge at a glance whether or not an order-receiving-side product inspection before delivery of products on the order receiving side or an ordering-side product inspection after delivery of products on the ordering side has been completed for a container. Therefore, it is possible to avoid erroneous shipping of products on the order receiving side and to avoid omission of product inspection or duplicate product inspection operations on the ordering side.

BRIEF DESCRIPTION OF THE DRAWINGS

FIG. 4A is an explanatory diagram schematically showing the structure of a container.

FIG. 4B is an explanatory diagram showing the structure of the container mainly with respect to the structure of a display unit.

FIG. 4C is an explanatory diagram showing examples of codes assigned to a container, a radio tag, and a display unit.

FIG. 7 is an explanatory diagram showing one example of ordering data.

FIG. 8 is an explanatory diagram showing one example of order reception data.

FIG. 9A is an explanatory diagram showing one example of delivery data.

FIG. 9B is an explanatory diagram showing an example of delivery data different from FIG. 9A.

FIG. 9C is an explanatory diagram showing an example of delivery data different from FIGS. 9A and 9B.

FIG. 10A is an explanatory diagram showing one example of display contents of a display unit of a container in a state where display contents are cleared.

FIG. 10B is an explanatory diagram showing one example of display contents of a display unit of a container when an order-receiving-side product inspection is completed.

FIG. 10C is an explanatory diagram showing one example of display contents of a display unit of a container when an ordering-side product inspection is completed.

FIG. 10D is an explanatory diagram showing one example of display contents of a display unit of a container when there is a product surplus or shortage.

MODE FOR CARRYING OUT THE INVENTION

Hereinbelow, an embodiment of a product delivery inspection system of this invention will be described with reference to the drawings.

Embodiment

Figure 1:
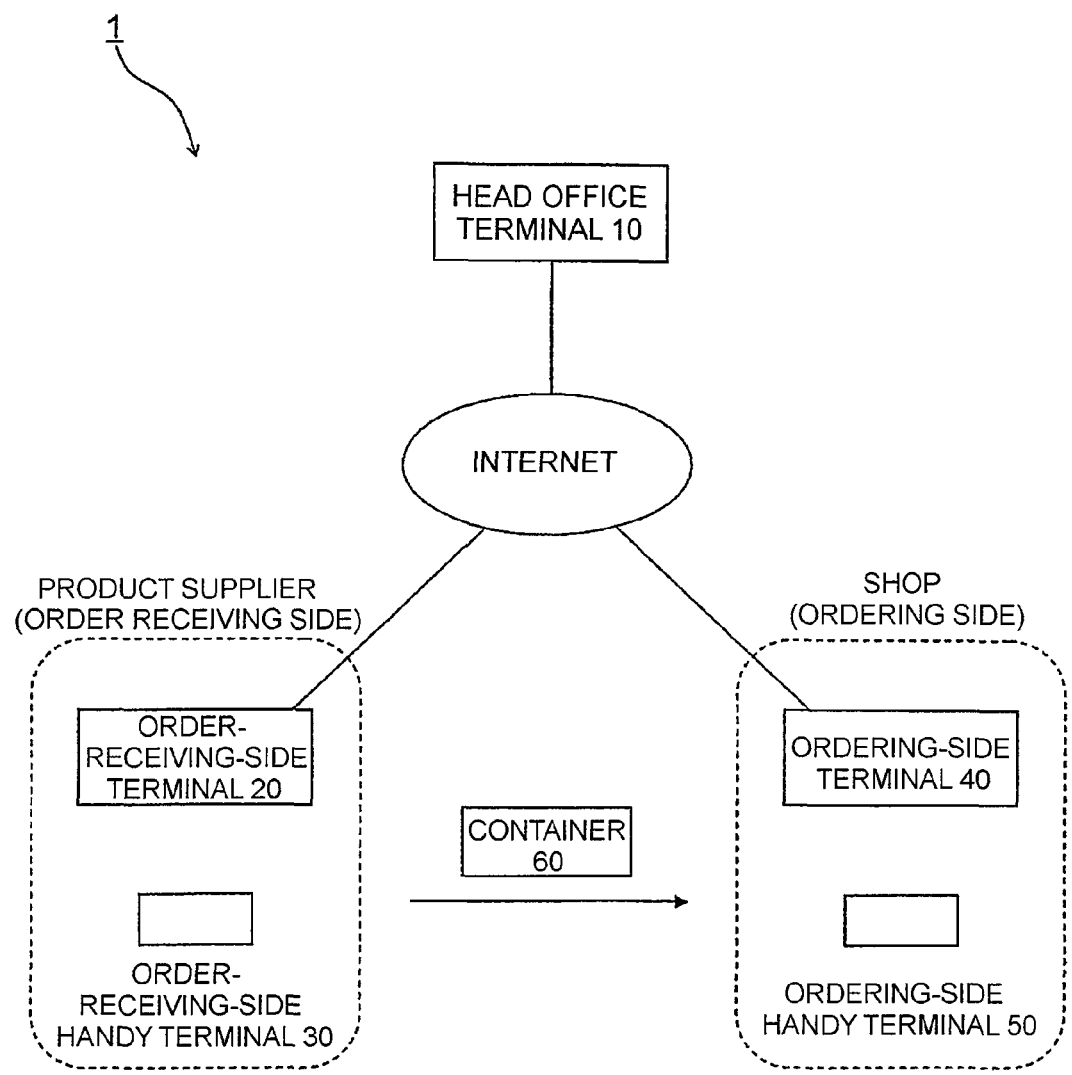
FIG. 1 is a schematic diagram showing an embodiment of a product delivery inspection system of this invention.

As shown in FIG. 1, a product delivery inspection system 1 as an embodiment of this invention comprises at least a head office terminal 10 provided in the head office of the franchise, an order-receiving-side terminal 20 provided in a product supplier (order receiving side) that delivers products, an order-receiving-side handy terminal 30 for use in an order-receiving-side product inspection of ordered products on the product supplier side, an ordering-side terminal 40 provided in an affiliate shop (ordering side) of the franchise, an ordering-side handy terminal 50 for use in an ordering-side product inspection of delivered products on the shop side, and a container 60 for use when delivering products from the product supplier to the shop. Alternatively, the product delivery inspection system 1 may be configured such that the head office terminal 10 is omitted and that the ordering-side terminal 40 places an order directly with the order-receiving-side terminal 20.

The head office terminal 10, the order-receiving-side terminal 20, and the ordering-side terminal 40 are information processing terminals, such as personal computers, each of which has a storage section, a control section, an input section, an output section, a communication section, an auxiliary storage device, and so on and which are connected to each other through the Internet line as shown in FIG. 1. A communication network for connecting the head office terminal 10, the order-receiving-side terminal 20, and the ordering-side terminal 40 to each other is not limited to the Internet line and may be any network.

Figure 2:
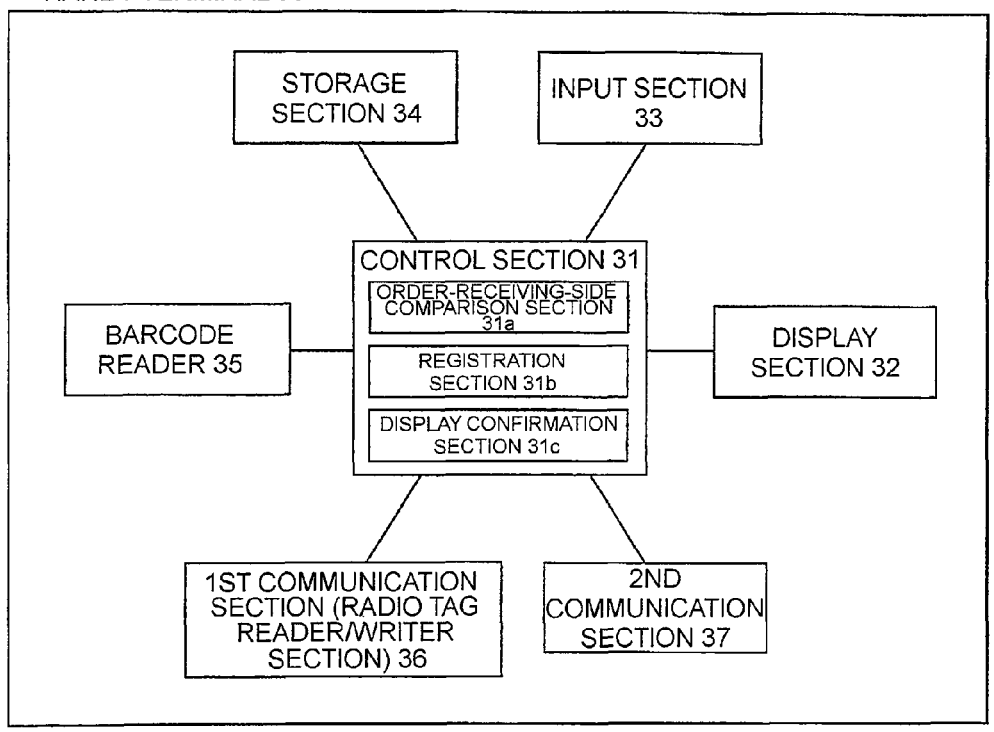
FIG. 2 is an explanatory diagram schematically showing the structure of an order-receiving-side handy terminal.

As shown in FIG. 2, the order-receiving-side handy terminal 30 has a control section 31 that controls the entire order-receiving-side handy terminal 30, a display section 32 comprising an LCD (Liquid Crystal Display) and so on, an input section 33 comprising keys provided on a touch panel, buttons provided outside the touch panel, and so on, a storage section 34 that stores various data, a barcode reader 35 that reads a product code from a barcode attached to a product, a first communication section (radio tag reader/writer section) 36 that communicates with a radio tag 61 of a container 60 to perform data reading and data writing, and a second communication section 37 that communicates with a display unit 62 of the container 60 and the order-receiving-side terminal 20.

As shown in FIG. 2, the control section 31 of the order-receiving-side handy terminal 30 has an order-receiving-side comparison section 31a that makes a comparison between delivery data and order reception data, a registration section 31b that confirms whether or not there is a product code in order reception data and, if there is the product code, registers it as delivery data in the storage section 34, and a display confirmation section 31c that confirms whether there is no display unit 62 to which data for display is not transmitted.

The second communication section 37 of the order-receiving-side handy terminal 30 is a communication section that performs communication using a communication system (short-distance wireless communication such as Bluetooth (registered trademark), or infrared communication) which is different from a communication system between the first communication section 36 and the radio tag 61.

Figure 3:
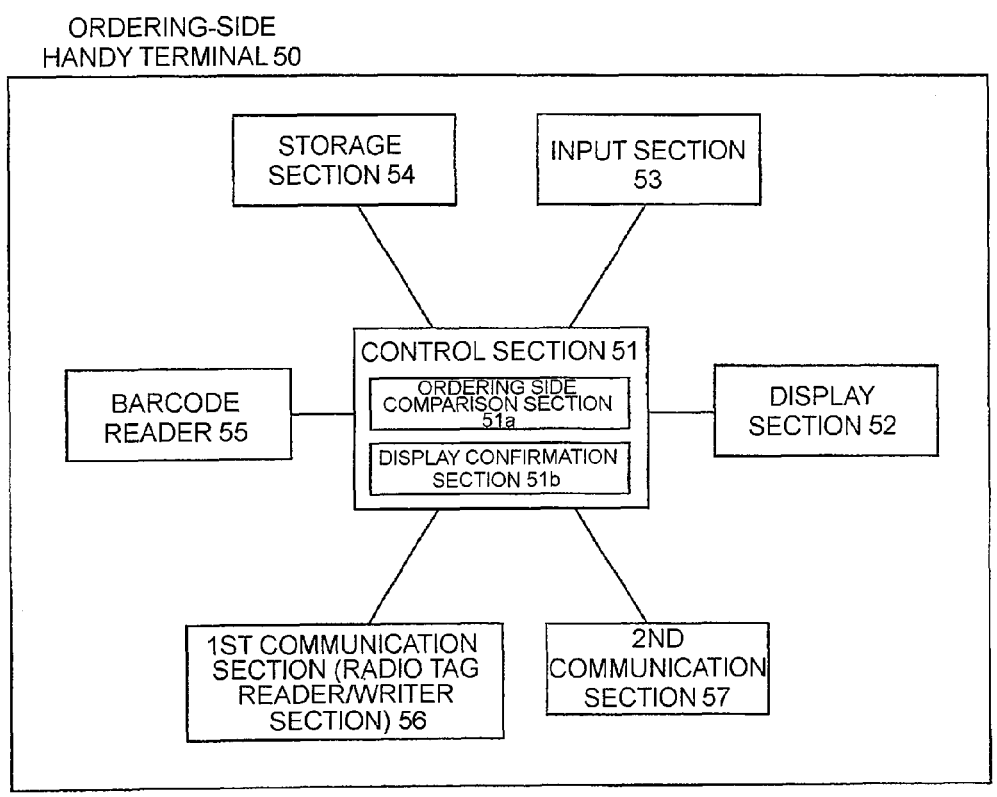
FIG. 3 is an explanatory diagram schematically showing the structure of an ordering-side handy terminal.

As shown in FIG. 3, the ordering-side handy terminal 50 has a control section 51 that controls the entire ordering-side handy terminal 50, a display section 52 comprising an LCD (Liquid Crystal Display) and so on, an input section 53 comprising keys provided on a touch panel, buttons provided outside the touch panel, and so on, a storage section 54 that stores various data, a barcode reader 55 that reads a barcode of a product, a first communication section (radio tag reader/writer section) 56 that communicates with a radio tag 61 of a container 60 to perform data reading and data writing, and a second communication section 57 that communicates with a display unit 62 of the container 60 and the ordering-side terminal 40.

As shown in FIG. 3, the control section 51 of the ordering-side handy terminal 50 has an ordering-side comparison section 51a that makes a comparison between delivery data and ordering data, and a display confirmation section 51b that confirms whether there is no display unit 62 to which data for display is not transmitted.

The second communication section 57 of the ordering-side handy terminal 50 is a communication section that performs communication using a communication system (short-distance wireless communication such as Bluetooth, or infrared communication) which is different from a communication system between the first communication section 56 and the radio tag 61.

As shown in FIG. 4A, the container 60 has a radio tag 61 and a display unit 62.

The radio tag 61 is, for example, a passive radio tag of a system such as FeliCa (registered trademark), thus having no power supply and adapted to obtain power from a radio wave that is transmitted during communication for reading or writing. In the case where the frequency of the radio tag 61 is set equal to that of electronic money and a handy terminal has functions of reading a barcode of a product, registering the product, and settling with the electronic money, the handy terminal for use in a product delivery inspection can be used also as a simple POS device in a shop so that it is possible to achieve a cost reduction compared to an inspection-dedicated handy terminal.

As shown in FIG. 4B, the display unit 62 comprises at least a display section 62a comprising an LCD and so on, a battery 62b as a power supply, a control section 62c that controls the entire display unit 62, and a communication section 62d that performs communication using a system (short-distance wireless communication such as Bluetooth, or infrared communication) which is different from that of the radio tag 61. The battery 62b may be a solar cell.

As shown in FIG. 4C, the container 60, the radio tag 61, and the display unit 62 are respectively assigned codes. In this embodiment, when the container number is C0001, the ID code of the radio tag 61 is C0001T and the ID code of the display unit 62 is C0001D. The container number, the ID code of the radio tag 61, and the ID code of the display unit 62 are stored in the radio tag 61. The container number and the ID code of the display unit 62 are stored in the control section of the display unit 62. The container number and the ID code of the radio tag 61 may be identical to each other.

Next, the processing flow from ordering of products from the shop to the product supplier until the products are delivered from the product supplier to the shop and inspected, using the product delivery inspection system 1 of this invention, will be described hereinbelow.

First, products are ordered from the ordering-side terminal 40 and ordering data is transmitted to the order-receiving-side terminal 20 via the head office terminal 10. Herein, FIG. 7 is one example of the ordering data that is stored in the ordering-side terminal 40 and transmitted, while FIG. 8 is one example of order reception data that is stored in the order-receiving-side terminal 20 in response to receipt of the ordering data.

Figure 5:
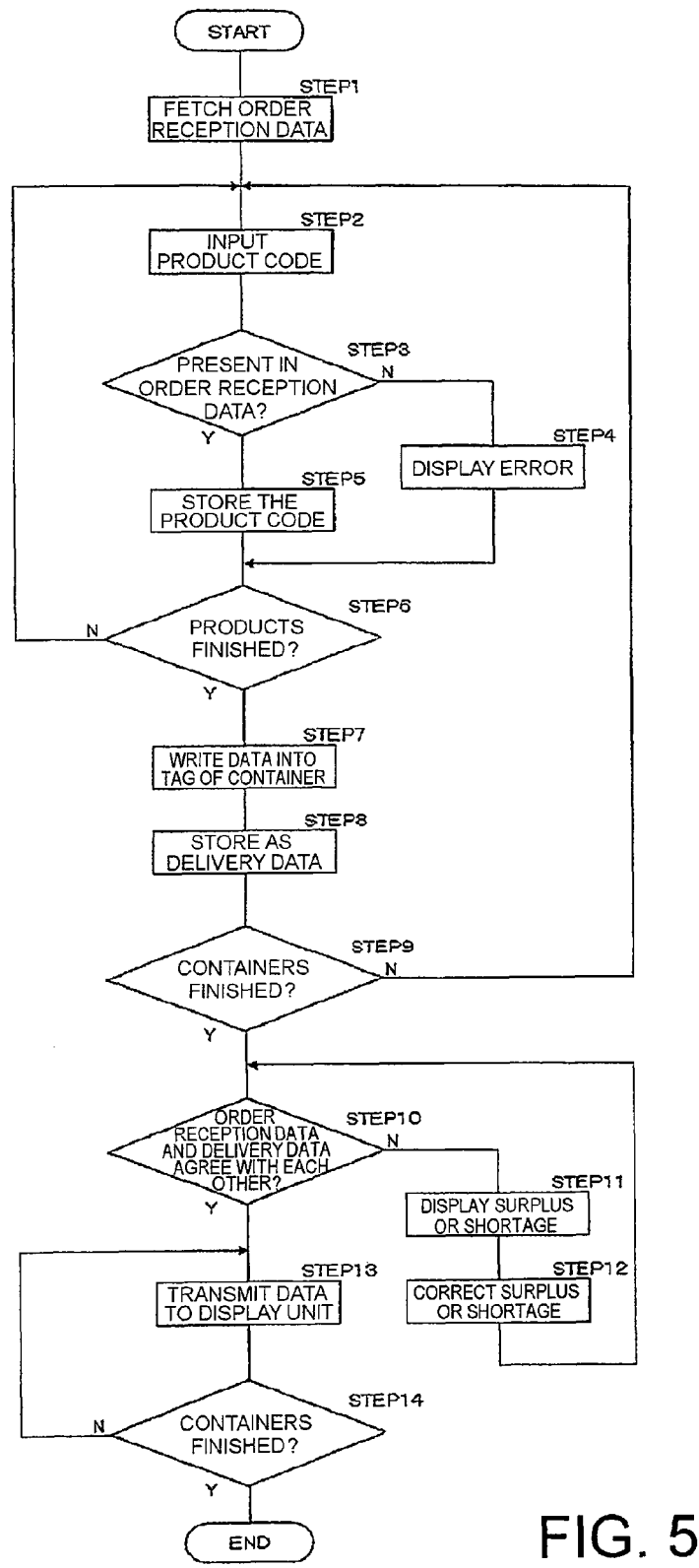
FIG. 5 is a flowchart diagram showing a processing flow of an order-receiving-side product inspection on the order receiving side.

Referring to FIG. 5, a product inspection of the ordered products which is carried out using the order-receiving-side handy terminal 30 on the product supplier side will be described hereinbelow.

A worker of the product supplier prepares the ordered products based on the order reception data that is printed out from the order-receiving-side terminal 20, and places them in containers 60. Thereafter, the worker of the product supplier carries out a product inspection according to the following processing flow using the order-receiving-side handy terminal 30. It is to be noted that delivery data in radio tags 61 and displays of display units 62 of the containers 60 are cleared in advance using the order-receiving-side handy terminal 30. FIG. 10A shows one example of a display of the display unit 62 in a cleared state.

First, the order reception data is fetched and stored in the order-receiving-side handy terminal 30 (STEP1). The order reception data is fetched through the second communication section 37 from the order-receiving-side terminal 20 having a communication section corresponding to the second communication section 37. The order reception data may be fetched not by the second communication section 37 but by another means (e.g. wired connection).

Then, using the barcode reader 35, a barcode of one of the products placed in one of the containers 60 is read so that a product code is input (STEP 2).

Then, the registration section 31b confirms whether or not the product code read by the barcode reader 35 exists in the order reception data (STEP3). In this event, unless the product code exists in the order reception data, error is displayed (STEP4). The product judged to be error is removed from the container 60. For the same products, a quantity may be input after reading a barcode of one of the products. If the product code exists in the order reception data, this product code is stored in the storage section 34 (STEP5).

Then, the control section 31 confirms whether there is a key input indicating that all the products placed in the one of the containers 60 have been input (STEP6).

If there is no such a key input (N in STEP6), STEP2 to STEP6 are repeated until all the products placed in the one of the containers 60 have been input.

If there is such a key input (Y in STEP6), data including at least the product codes and product quantities of the products placed in the one of the containers 60 is written into the radio tag 61 of this container 60 through the first communication section 36 (STEP7).

In this event, a container number of this container 60, an ID code of the radio tag 61, and an ID code of the display unit 62 are acquired from the radio tag 61 of this container 60 through the first communication section 36 and stored in the storage section 34 along with the above-mentioned data of the products as delivery data (STEP8).

Then, the control section 31 confirms whether there is a key input indicating that product inputs of all the containers 60 have been finished (STEP9).

If there is no such a key input (N in STEP9), STEP2 to STEP9 are repeated until the product inputs of all the containers 60 have been finished.

On the other hand, if there is such a key input (Y in STEP9), the order-receiving-side comparison section 31a confirms whether or not the order reception data and the delivery data agree with each other (kinds and quantities of the products are in agreement) (STEP10). FIGS. 9A to 9C are examples of the delivery data which are stored in the storage section 34 of the order-receiving-side handy terminal 30. With the examples shown in FIGS. 9A to 9C, there is shown a case where the products are placed in three containers 60. The delivery data are respectively stored in the radio tags 61 of the containers 60. The order-receiving-side comparison section 31a makes a comparison between the order reception data and the sum of the delivery data of the containers 60 and confirms whether or not the order reception data and the delivery data agree with each other.

If the order reception data and the delivery data do not agree with each other (N in STEP10), a surplus or shortage product and its quantity are displayed (STEP11). Then, the product surplus or shortage in the container 60 is corrected, the delivery data in the order-receiving-side handy terminal 30 is corrected, and the data in the radio tag 61 of the container 60 is corrected through the first communication section 36 (STEP12).

If the order reception data and the delivery data agree with each other (Y in STEP10), data for display is transmitted to the display unit 62 of the container 60 through the second communication section 37 (STEP13). FIG. 10B is one example of a display which is displayed on the display section 62a of the display unit 62 of the container 60 in this event.

Then, the display confirmation section 31c confirms whether there is no display unit 62 to which data for display is not transmitted (STEP14). The order-receiving-side handy terminal 30 grasps the display unit 62, to which the data is to be transmitted, by the display unit ID included in the delivery data. STEP13 and STEP14 are repeated until no detection of the display unit 62 to which the data is not transmitted.

Thereafter, the delivery data is transmitted to the order-receiving-side terminal 20 from the order-receiving-side handy terminal 30 through the second communication section 37 and the order-receiving-side terminal 20 stores the delivery data.

The writing of the delivery data into the radio tag 61 of the container 60 may be carried out not in STEP7 but after the agreement between the order reception data and the delivery data like the data transmission to the display unit 62.

In this manner, on the product supplier side, the worker can judge at a glance the container 60 for which the product inspection before delivery to the shop has been completed, so that the worker can move to a delivery operation. Therefore, compared to the conventional system, it is possible to further reduce erroneous shipping in the product supplier.

Figure 6:
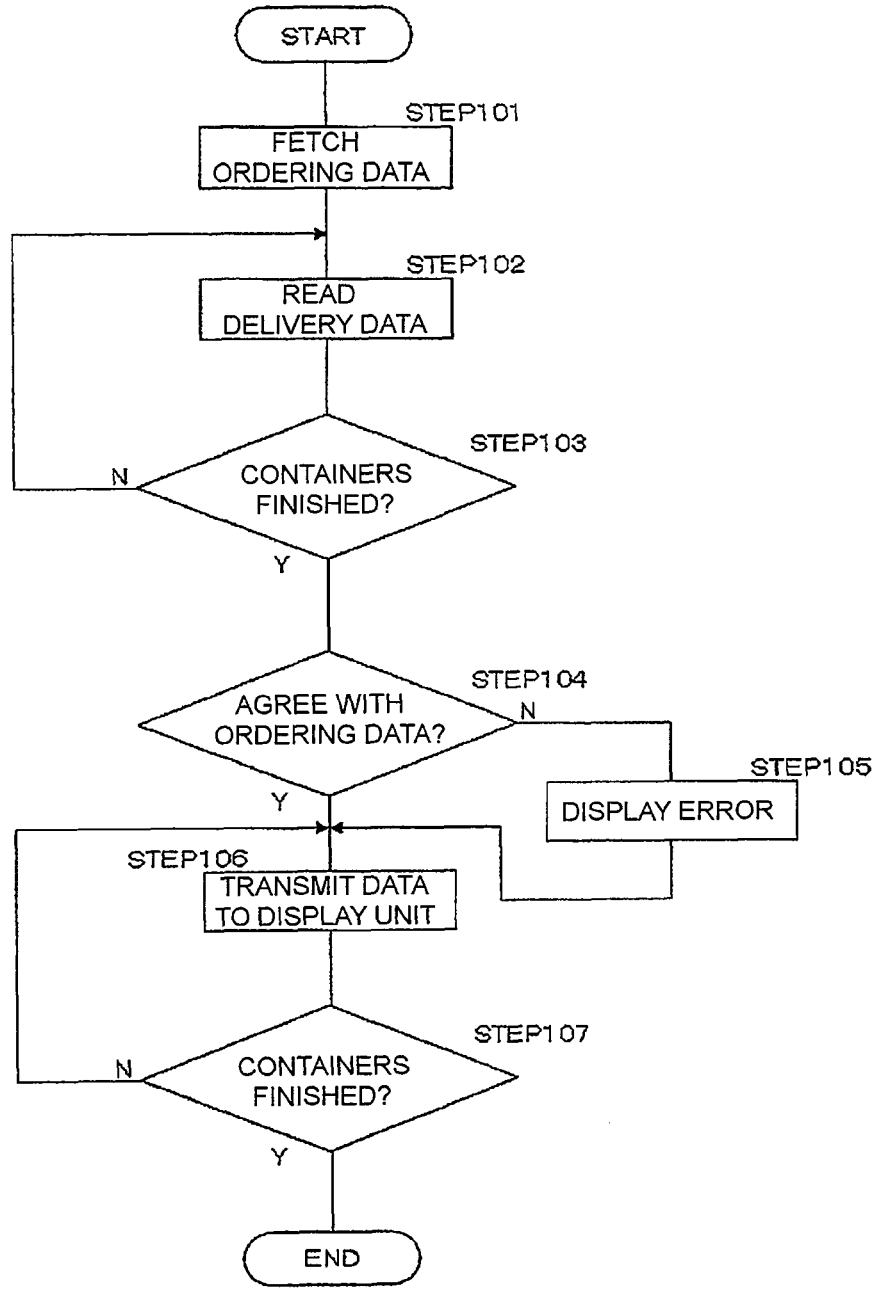
FIG. 6 is a flowchart diagram showing a processing flow of an ordering-side product inspection on the ordering side.

Next, referring to FIG. 6, a product inspection of the delivered products which is carried out using the ordering-side handy terminal 50 in the shop will be described.

First, the ordering data is fetched and stored in the storage section 54 of the ordering-side handy terminal 50 (STEP101). The ordering data is fetched through the second communication section 57 from the ordering-side terminal 40 having a communication section corresponding to the second communication section 57. The ordering data may be fetched not by the second communication section 57 but by another means (e.g. wired connection).

Then, the delivery data is read from the radio tag 61 of the container 60 through the first communication section 56 (STEP102).

Then, the control section 51 confirms whether there is a key input indicating that the delivery data of all the containers 60 have been read (STEP103).

If there is no such a key input (N in STEP103), STEP102 and STEP103 are repeated until the delivery data of all the containers 60 have been read.

On the other hand, if there is such a key input (Y in STEP103), the ordering-side comparison section 51a makes a comparison between the ordering data and the sum of all the delivery data and confirms whether or not the product codes and the product quantities are in agreement (STEP104).

If the ordering data and the sum of all the delivery data agree with each other (Y in STEP104), data for display is transmitted to the display unit 62 of the container 60 through the second communication section 57 (STEP106). FIG. 10C is one example of a display which is displayed on the display section of the display unit 62 of the container 60 in this event.

Then, the display confirmation section 51b confirms whether there is no display unit 62 to which data for display is not transmitted (STEP107). STEP106 and STEP107 are repeated until no detection of the display unit 62 to which the data is not transmitted.

If the ordering data and the sum of all the delivery data do not agree with each other (N in STEP104), an error display indicative of disagreement is carried out (STEP105). In this event, a surplus or shortage product and its quantity are also displayed.

Then, data for display is transmitted to the display unit 62 of the container 60 (STEP106). Through the second communication section 57, data for display of FIG. 10D is transmitted to the container 60 with surplus or shortage while data for display of FIG. 10C is transmitted to the container 60 with no surplus or shortage. It may be configured that data for display of FIG. 10D is transmitted to both the container 60 with surplus or shortage and the container 60 with no surplus or shortage.

Then, the display confirmation section 51b confirms whether there is no display unit 62 to which data for display is not transmitted (STEP107). The ordering-side handy terminal 50 grasps the display unit 62, to which the data is to be transmitted, by the display unit ID in the delivery data. STEP106 and STEP107 are repeated until no detection of the display unit 62 of the container 60 to which the data is not transmitted.

Thereafter, the result of the product inspection is transmitted to the ordering-side terminal 40 from the ordering-side handy terminal 50 through the second communication section 57 and the ordering-side terminal 40 stores it.

Figure 11A:
FIG. 11A is an explanatory diagram showing a modification of display contents of a display unit of a container and is an explanatory diagram showing a display in an initial state.
Figure 11B:
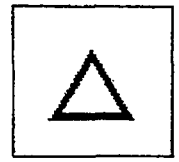
FIG. 11B is an explanatory diagram showing a modification of display contents of a display unit of a container and is an explanatory diagram showing a display when order reception data and delivery data agree with each other.
Figure 11C:
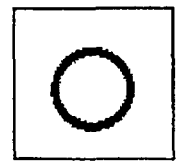
FIG. 11C is an explanatory diagram showing a modification of display contents of a display unit of a container and is an explanatory diagram showing a display when ordering data and the sum of all delivery data agree with each other.
Figure 11D:
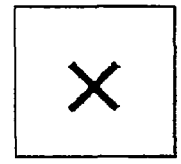
FIG. 11D is an explanatory diagram showing a modification of display contents of a display unit of a container and is an explanatory diagram showing a display when there is a product surplus or shortage.

With respect to the display of the display unit 62, only a symbol may be displayed as shown in FIGS. 11A to 11D instead of the display in each of FIGS. 10A to 10D. FIGS. 11A to 11D each show the entire screen of a display section. FIG. 11A shows an initial state, FIG. 11B is one example of a display when order reception data and delivery data agree with each other, FIG. 11C is one example of a display when ordering data and the sum of all delivery data agree with each other, and FIG. 11D is one example of a display that is displayed on a container 60 with surplus or shortage.

In this manner, in the shop, a worker can judge at a glance the container 60 for which the product inspection of the delivered products has been completed, so that the worker can move to an operation of exhibiting the products on a shelf or an operation of storing the products in a warehouse. Therefore, there is no occurrence of omission of product inspection due to misunderstanding that the product inspection operation has been completed or there is no occurrence of duplicate product inspection operations due to misunderstanding that the product inspection has not been completed, thus preventing the occurrence of inconsistency of product inspection data. Accordingly, the products can be placed on a display shelf of the shop after promptly completing the product inspection operation so that the chance of sale is prevented from being lost due to prolongation of the product inspection operation.

In the above-mentioned embodiment, the ordering-side handy terminal is described as having the barcode reader. However, the ordering-side handy terminal is not necessarily provided with the barcode reader.

In the above-mentioned embodiment, it is configured that the handy terminal communicates with the display unit using the second communication section that performs communication by the communication system different from that of the radio tag. However, it may be configured that the handy terminal performs radio communication with the display unit by a communication system different from that of the radio tag using hardware of the first communication section (radio tag reader/writer section) without providing the second communication section.

In the above-mentioned embodiment, it is configured that the handy terminal communicates with the display unit using the second communication section that performs communication by the communication system different from that of the radio tag. However, it may be configured that the handy terminal communicates with the display unit by the same communication system as that of the radio tag using the first communication section (radio tag reader/writer section) without providing the second communication section. In this case, the display unit performs communication as an active radio tag.

DESCRIPTION OF SYMBOLS 1 product delivery inspection system
10 head office terminal
20 order-receiving-side terminal
30 order-receiving-side handy terminal
31 control section
31a order-receiving-side comparison section
31b registration section
31c display confirmation section
32 display section
33 input section
34 storage section
35 barcode reader
36 first communication section
37 second communication section
40 ordering-side terminal
50 ordering-side handy terminal
51 control section
51a ordering-side comparison section
51b display confirmation section
52 display section
53 input section
54 storage section
55 barcode reader
56 first communication section
57 second communication section
60 container
61 radio tag
62 display unit
62a display section
62b battery
62c control section
62d communication section

The invention claimed is:

1. A product delivery inspection system comprising an ordering-side terminal that transmits ordering data, an order-receiving-side terminal that receives the ordering data and stores the ordering data as order reception data, an order-receiving-side handy terminal for use in an order-receiving-side product inspection of a product before delivery thereof, a container for use in the delivery of the product, and an ordering-side handy terminal for use in an ordering-side product inspection of the product after the delivery thereof,
wherein the container comprises a radio tag and a display unit,
wherein the order-receiving-side handy terminal comprises an order-receiving-side reception means that receives the order reception data from the order-receiving-side terminal, a barcode reading means that reads a product code from a barcode attached to the product, a tag writing means that writes, into the radio tag, data including the product code read by the barcode reading means when it is judged by the order-receiving-side handy terminal that a key input indicating that all the products placed in the one of the container is input and a product quantity, an order-receiving-side comparison means that compares the product code read by the barcode reading means and the product quantity with a product code and a product quantity included in the order reception data, an order-receiving-side display instruction means that transmits to the display unit a display instruction to display a message or a symbol indicative of the completion of the order-receiving-side product inspection when it is judged by the order-receiving-side comparison means that the product codes and the product quantities are in agreement, a display means for displaying a name and a quantity of a surplus or shortage product when it is judged by the order-receiving-side comparison means that the product codes and the product quantities are not in agreement and a product surplus or shortage occurs, and a correcting means for correcting the data when the product surplus or shortage in the container is corrected,
wherein the order-receiving-side handy terminal grasps the display unit, to which the data is to be transmitted, by a display unit ID included in a delivery data,
wherein the tag writing means writes corrected data of the name and the quantity of the product into the radio tag, and
wherein the ordering-side handy terminal comprises an ordering-side reception means that receives the ordering data from the ordering-side terminal, a tag reading means that reads, from the radio tag, the product code and the product quantity written by the tag writing means, an ordering-side comparison means that compares the product code and the product quantity read by the tag reading means with a product code and a product quantity included in the ordering data when it is judged by the order-side handy terminal that a key input indicating that the delivery data of all the container is read, and an ordering-side display instruction means that transmits to the display unit a display instruction to display a message or a symbol indicative of the completion of the ordering-side product inspection when it is judged by the ordering-side comparison means that the product codes and the product quantities are in agreement or to display a name and a quantity of a surplus or shortage product when it is judged by the ordering-side comparison means that the product codes and the product quantities are not in agreement and a product surplus or shortage occurs,
wherein the ordering-side handy terminal grasps the display unit, to which the data is to be transmitted, by the display unit ID in the delivery data,
wherein the ordering-side handy terminal and the order-receiving-side handy terminal have functions of reading the barcode of the product, registering the product, and settling with an electronic money, and
wherein a frequency of the radio tag is set equal to that of the electronic money.

2. The product delivery inspection system according to claim 1, wherein the message indicative of the completion of the order-receiving-side product inspection and the message indicative of the completion of the ordering-side product inspection each include an instruction for a next operation.

3. The product delivery inspection system according to claim 1, wherein each of the order-receiving-side display instruction means and the ordering-side display instruction means communicates with the display unit using short-distance wireless communication or infrared communication which is different from a communication system of the tag writing means.

4. The product delivery inspection system according to claim 3, wherein the radio tag is a passive radio tag that receives a power supply from a radio wave of a communication counterpart and the display unit receives a power supply from a battery.

5. An order-receiving-side handy terminal for use in an order-receiving-side product inspection of a product before delivery thereof, comprising:
a barcode reading means that reads a product code from a barcode attached to the product, a tag writing means that writes, into a radio tag of a container, data including the product code read by the barcode reading means when it is judged by the order-receiving-side handy terminal that a key input indicating that all the products placed in the one of the container is inputted and a product quantity, an order-receiving-side comparison means that compares the product code read by the barcode reading means and the product quantity with a product code and a product quantity included in order reception data, an order-receiving-side display instruction means that transmits to a display unit of the container a display instruction to display a message or a symbol indicative of the completion of the order-receiving-side product inspection when it is judged by the order-receiving-side comparison means that the product codes and the product quantities are in agreement, a display means for displaying a name and a quantity of a surplus or shortage product when it is judged by the order-receiving-side comparison means that the product codes and the product quantities are not in agreement and a product surplus or shortage occurs, and a correcting means for correcting the data when the product surplus or shortage in the container is corrected, the tag writing means writing corrected data of the name and the quantity of the product into the radio tag,
wherein the order-receiving-side handy terminal grasps the display unit, to which the data is to be transmitted, by a display unit ID included in a delivery data,
wherein the order-receiving-side handy terminal has functions of reading the barcode of the product, registering the product, and settling with an electronic money, and
wherein a frequency of the radio tag is set equal to that of the electronic money.

6. The order-receiving-side handy terminal according to claim 5, wherein the order-receiving-side display instruction means communicates with the display unit using short-distance wireless communication or infrared communication which is different from a communication system of the tag writing means.

7. The order-receiving-side handy terminal according to claim 6, wherein the radio tag is a passive radio tag that receives a power supply from a radio wave of a communication counterpart and the display unit receives a power supply from a battery.

8. An ordering-side handy terminal for use in an ordering-side product inspection of a product after delivery thereof, comprising:
a tag reading means that reads a product code and a product quantity from a radio tag of a container, an ordering-side comparison means that compares the product code and the product quantity read by the tag reading means with a product code and a product quantity included in ordering data when it is judged by the order-side handy terminal that a key input indicating that a delivery data of all the container is read, and an ordering-side display instruction means that transmits to a display unit of the container a display instruction to display a message or a symbol indicative of the completion of the ordering-side product inspection when it is judged by the ordering-side comparison means that the product codes and the product quantities are in agreement or to display a name and a quantity of a surplus or shortage product when it is judged by the ordering-side comparison means that the product codes and the product quantities are not in agreement and a product surplus or shortage occurs, and a display confirmation section configured to confirm whether or not the data for is transmitted to the display unit of the container,
wherein the ordering-side handy terminal grasps the display unit, to which the data is to be transmitted, by the display unit ID in the delivery data,
wherein the ordering-side handy terminal has functions of reading the barcode of the product, registering the product, and settling an electronic money, and
wherein a frequency of the radio tag is set equal to that of the electronic money.

9. The ordering-side handy terminal according to claim 8, wherein the ordering-side display instruction means communicates with the display unit using short-distance wireless communication or infrared communication which is different from a communication system of the tag reading means.

10. The ordering-side handy terminal according to claim 9, wherein the radio tag is a passive radio tag that receives a power supply from a radio wave of a communication counterpart and the display unit receives a power supply from a battery.

11. A container for use in delivery of a product, comprising:
a radio tag that stores at least a product code, a product quantity and corrected data of the product code and the product quantity in a readable and writable manner, and a display unit that receives a display instruction based on a product inspection result from a handy terminal for use in a product inspection, the display unit displaying a message or a symbol indicative of the completion of product inspection when the display instruction is based on the product inspection result that the handy terminal judges that the product codes and the product quantities are in agreement, the display unit displaying a name and a quantity of a surplus or shortage product when the display instruction is based on the product inspection result that the handy terminal judges that the product codes and the product quantities are not in agreement and a product surplus or shortage occurs, when there is a key input indicating that a delivery data of the container, and wherein the handy terminal grasps the display unit, to which the data is to be transmitted, by the display unit ID in the delivery data,
wherein the handy terminal has functions of reading the barcode of the product, registering the product, and settling with an electronic money, and
wherein a frequency of the radio tag is set equal to that of the electronic money.

12. The container according to claim 11,
wherein the radio tag is a passive radio tag that receives a power supply from a radio wave of a communication counterpart,
wherein the display unit receives a power supply from a battery, and
wherein the display unit communicates with the handy terminal using short-distance wireless communication or infrared communication which is different from a communication system of the radio tag.

* * * * *

UNITED STATES PATENT AND TRADEMARK OFFICE
CERTIFICATE OF CORRECTION

PATENT NO. : 9,846,852 B2
APPLICATION NO. : 14/383026
DATED : December 19, 2017
INVENTOR(S) : Satoru Narita It is certified that error appears in the above-identified patent and that said Letters Patent is hereby corrected as shown below:

In the Claims

Column 13, Claim 8, Line 42:
After "settling", insert --with--

Signed and Sealed this
Twenty-ninth Day of January, 2019

Andrei Iancu
*Director of the United States Patent and Trademark Office*